(12) United States Patent
Bertoni (10) Patent No.: US 8,406,735 B2
(45) Date of Patent: Mar. 26, 2013

(54) METHOD FOR PAIRING ELECTRONIC EQUIPMENT IN A WIRELESS NETWORK SYSTEM

(75) Inventor: Guido Marco Bertoni, Carnate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1153 days.

(21) Appl. No.: 12/145,365

(22) Filed: Jun. 24, 2008

(65) Prior Publication Data
US 2009/0318114 A1 Dec. 24, 2009

(51) Int. Cl.
*H04M 1/66* (2006.01)
*H04M 1/68* (2006.01)
*H04M 3/16* (2006.01)
*H04L 9/00* (2006.01)
*H04L 9/32* (2006.01)
*H04K 1/00* (2006.01)

(52) U.S. Cl. ......... 455/410; 455/411; 380/44; 380/260; 380/255; 713/168; 713/171

(58) Field of Classification Search ............... 455/410, 455/411, 41.1, 41.2, 41.3; 380/44, 249, 270–272, 380/255, 273, 259, 262; 713/168, 169, 170, 713/171, 163
See application file for complete search history.

(56) References Cited

U.S. PATENT DOCUMENTS

| 6,993,134 | B1 * | 1/2006 | Epstein | 380/262 |
| 7,181,014 | B1 * | 2/2007 | Srivastava | 380/278 |
| 7,912,789 | B2 * | 3/2011 | Nakano et al. | 705/64 |
| 2002/0166070 | A1 * | 11/2002 | Mualem et al. | 713/201 |
| 2004/0176071 | A1 * | 9/2004 | Gehrmann et al. | 455/411 |
| 2006/0224893 | A1 * | 10/2006 | Sales et al. | 713/171 |

OTHER PUBLICATIONS

Bluetooth Special Interest Group, Simple Pairing Whitepaper, Aug. 3, 2006, 23 pages.

* cited by examiner

*Primary Examiner* — Wesley Kim
(74) *Attorney, Agent, or Firm* — Seed IP Law Group PLLC

(57) ABSTRACT

A method pairs electronic equipment, particularly, in a wireless network system. The method includes: providing first and second wireless electronic equipment to be paired which store a first and a second public key, respectively, and providing a user with a wireless portable electronic device which stores a third public key. Then, the portable electronic device transmits the third public key in turn to the first and second electronic equipment, and receiving from the first and second equipment the first and second public keys, respectively. Moreover, the portable electronic device calculates first and second numbers starting from the first and second public keys, respectively. The same first and second numbers is independently calculated by the first and second electronic equipment, respectively, starting from the third public key and representing secret numbers shared between the portable device and the first and second electronic equipment. Finally, the portable device provides a secure communication key to be transmitted in turn to the first and second equipment through encryption with the first and second secret numbers, respectively.

37 Claims, 8 Drawing Sheets

METHOD FOR PAIRING ELECTRONIC EQUIPMENT IN A WIRELESS NETWORK SYSTEM

TECHNICAL FIELD

The present disclosure generally relates to wireless networks, and particularly but not exclusively to a method for pairing electronic equipment in an in-home wireless network system to ensure a secure communication among them.

BACKGROUND INFORMATION

Nowadays, different consumer electronic equipment are available at home. Some electronic equipment, such as digital TVs, set-top boxes, mobile phones, PDAs, DVD players, laptop computers, refrigerators, are provided with wireless communication modules thus forming an in-home wireless network system. In order to establish a secure communication among two or more wireless equipment, they are paired, e.g., each electronic equipment involved in the communication is paired to each other equipment before receiving or transmitting any message.

In accordance with a first known pairing solution, such electronic equipment share a common secret for securely communicating, e.g., they share a common secret key. This solution is, for example, adopted in the field of banking or satellite television. In fact, smart cards employed to manage financial transactions and the ones involved in pay-per view television services are usually provided with their own secret key to ensure a secure communication with other equipment provided with the same key.

In accordance with a second pairing solution, a third party is trusted as a certification authority. This solution is adopted, for example, to allow secure communications over the internet.

Whether both solutions above are not available, a further solution provides that a user can be considered as a secure third party in the authentication and pairing of electronic equipment. For example, such further solution is commonly used to perform pairing of wireless electronic equipment in accordance with a Bluetooth technology. In this case, as known by those skilled in the art, the Bluetooth equipment to be paired are put close one to the other in order to clearly exchange their public keys. The user has to check on a display of each of the two equipment/devices that a same reference number is correctly displayed, so as to ensure that nobody has modified the communication and the public keys have been exchanged correctly.

A drawback of Bluetooth pairing is that checking can be performed by the user only if the wireless equipment/devices are close to each other. However, this is not the case of an in-home wireless network system which usually comprises large electronic equipment, such as TVs, refrigerators or DVD players located in different rooms of the home.

BRIEF SUMMARY

In one embodiment, a method for pairing electronic equipment in a wireless network system comprises:

providing first and second wireless electronic equipment of the system to be paired which store a first and a second public key, respectively, providing a user with a wireless portable electronic device which stores a third public key, transmitting by the portable electronic device said third public key in turn to the first and second electronic equipment, and receiving from the first and second equipment said first and second public keys, respectively, calculating by said portable electronic device first and second numbers starting from the first and second public keys, respectively, the same first and second numbers being independently calculated by the first and second electronic equipment, respectively, starting from said third public key and representing secret numbers shared between the portable device and said first and second electronic equipment, providing by the portable device a secure communication key to be transmitted in turn to the first and second equipment through encryption with said first and second secret numbers, respectively.

In further embodiments, a wireless network system and a wireless portable electronic device for pairing electronic equipment in such wireless network system are also provided.

BRIEF DESCRIPTION OF THE SEVERAL VIEWS OF THE DRAWINGS

The features of the present embodiment(s) will be better understood from the following detailed description, which is given by way of illustrative and non-limiting example with reference to the annexed drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
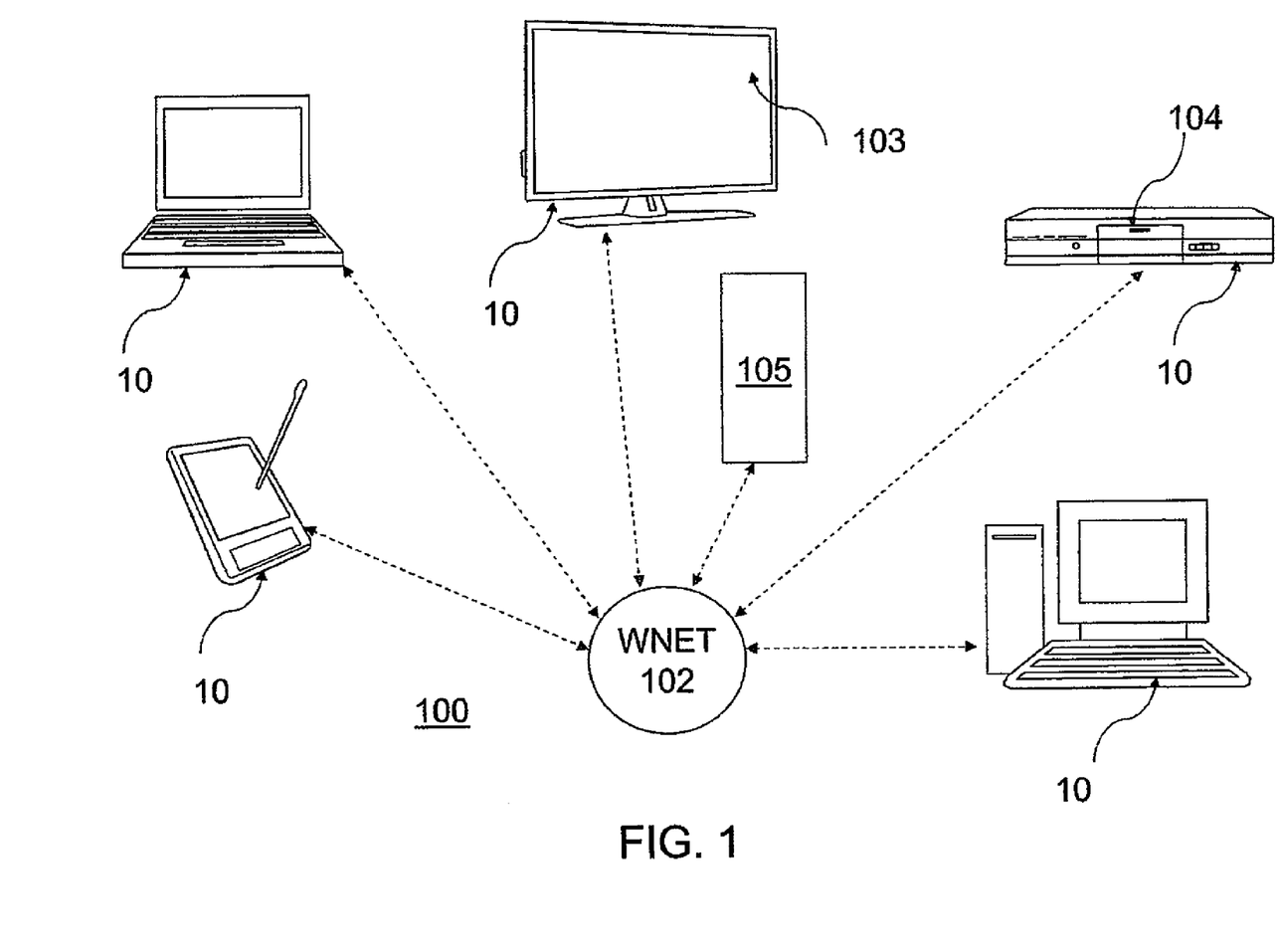
FIG. 1 shows schematically an embodiment of a wireless network system comprising a plurality of consumer electronic equipment to be paired.

An embodiment of a wireless network system 100 arranged to ensure a secure communication among different electronic equipment/devices can be described with reference to FIG. 1. Particularly, in the following, we refer to a non limiting embodiment of an in-home wireless network system but the same principles and results can be applied to other wireless systems, such as a wireless network system within an office or other location.

Such in-home network system 100 comprises a plurality of consumer electronic equipment 10 such as a digital TV, a set-top box, a mobile phone, a PDA, a DVD player, a laptop or desktop computer, a refrigerator, a washing machine or a webcam, and/or other devices. Particularly, each electronic equipment 10 of the system 100 is provided with respective wireless facilities in order to communicate with each other equipment of the home through a wireless network 102 (WNET).

For simplicity, in the following, reference is made to a first 103 and second 104 consumer electronic equipment of the wireless in-home network system 100 of FIG. 1, for example a digital TV and a DVD player, respectively. Each one of such equipment can be placed in a different room at home.

Figure 2:
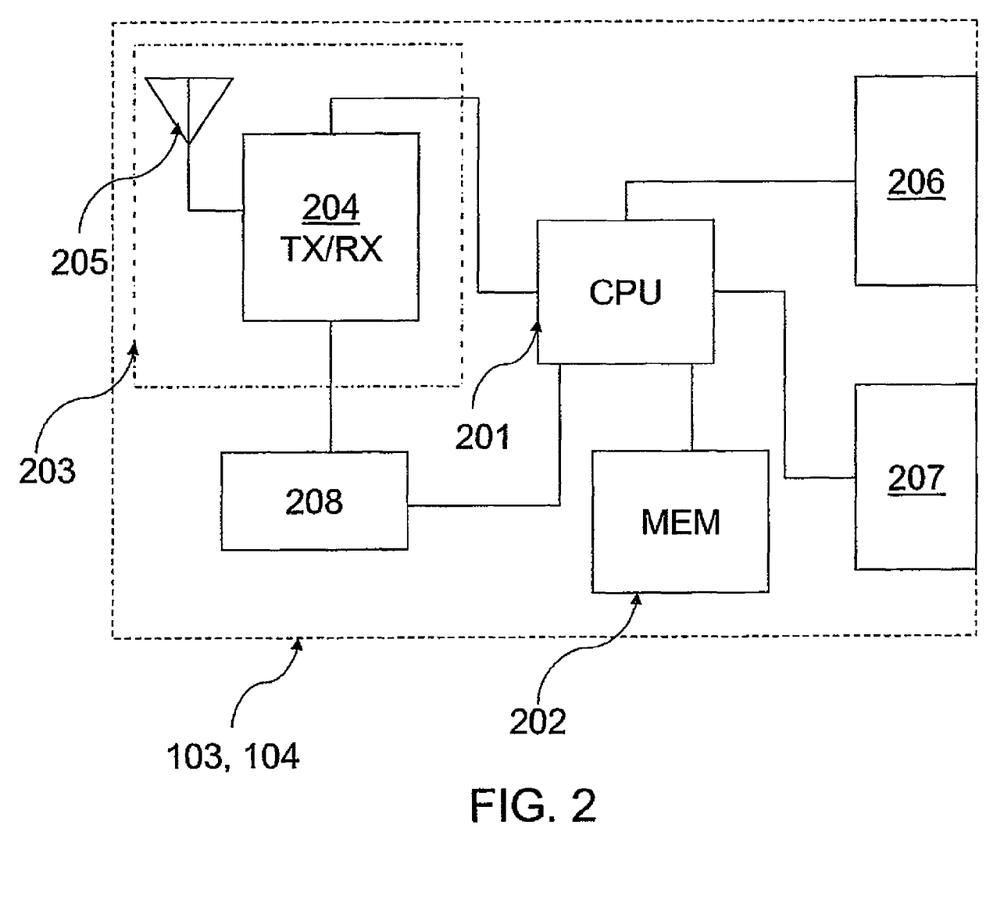
FIG. 2 shows schematically a structure of an embodiment of a consumer electronic equipment of the system of FIG. 1.

An equipment structure of both first 103 and second 104 consumer electronic equipment showing their example electronic components is schematically shown in FIG. 2. In more detail, such equipment 103, 104 are provided with a central processing unit 201 (CPU) for controlling various functions of the equipment according to a control program (such as a computer program or other computer-readable instructions) stored in a system memory 202 (MEM) or other computer-readable medium coupled to the processing unit 201, with the control program being executable by the processing unit 201. Particularly, the central processing unit 201 is arranged to control a wireless communication module 203 of each equipment 103, 104.

In one embodiment, such wireless module 203 comprises a RF transceiver (Tx/Rx) 204 coupled to an antenna 205 acting to transmit/receive wireless signals. For example, such RF transceiver 204 can operate in accordance with different wireless communication standard protocols, such as Bluetooth, WLAN (Wireless Local Area Network), NFC (Near Field Communication), ZigBee or Wibree, and/or others.

In an embodiment, the wireless communication module 203 is implemented as electronic circuitry directly embedded into the first 103 and second 104 equipment. Alternatively, such module 203 is provided outside such equipment 103, 104 in a separated device coupleable to the first 103 or second 104 equipment. For example, the wireless module 203 can be provided within a USB (Universal Serial Bus) mass storage coupleable to a respective USB port comprised in both equipment 103, 104.

Moreover, the first 103 and second 104 electronic equipment comprise an encoder/decoder block 208 coupled to and controlled by the central unit CPU 201 acting to encrypt/decrypt data streams exchanged with other electronic equipment.

In addition, both the first 103 and second 104 equipment are also provided with a display unit 206 (e.g., a liquid crystal display), and a user interface 207, such as, for example, an alphanumeric keyboard.

In one embodiment, the in-home wireless network system 100 also comprises an electronic device 105 configured to communicate with both the first 103 and second 104 consumer equipment for pairing such equipment.

In a further embodiment, such electronic device 105 can be comprised in a remote control equipment operating in a stand alone configuration. Otherwise, the same device 105 can be embedded in a TV or VCR or DVD remote control or in a mobile phone. In other words, the device 105 may be a portable electronic device suitable to be handled by a user and displaced from a room to another within a home.

In the following, we assume that the electronic device 105 is comprised in a remote control device (or "r-c device" for simplicity).

Figure 3:
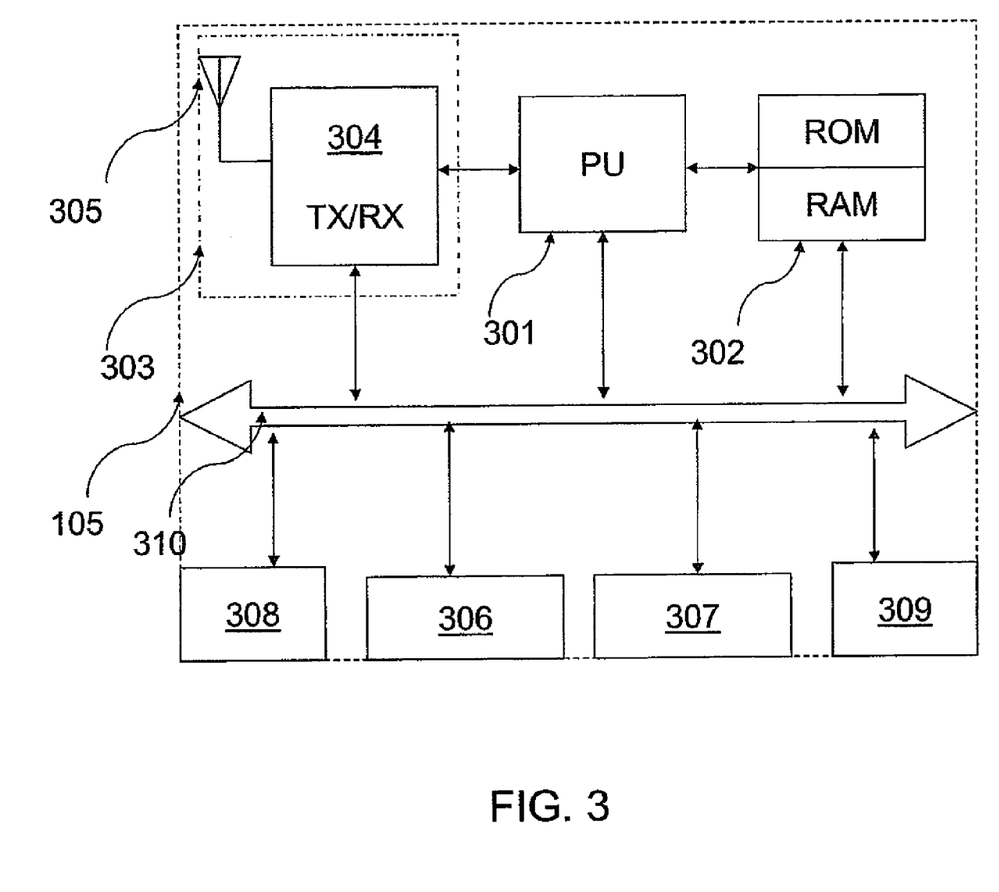
FIG. 3 shows schematically an embodiment of an electronic device for pairing the consumer electronic equipment of the system of FIG. 1.

An embodiment of such r-c device 105 can be described with reference to the block scheme of FIG. 3.

In more detail, the r-c device 105 comprises a processing unit (PU) 301 comprising a microprocessor or microcontroller. Alternatively, the processing unit 301 can comprise a dedicated processor such as a DSP (Digital Signal Processor). The processing unit PU 301 is coupled to multiple memory elements 302 comprising secure data stored in secure memory such as read only memory (ROM) but may be a type of electronically erasable programmable read only memory (EEPROM) or other ROM type. Such memory elements 302 can also comprise a random access memory (RAM) generally used by the PU 301 for running programs and temporary storage. In addition, such memory elements 302 can be implemented within the same chip of the processing unit PU 301 or, alternatively, are external memory elements coupled with it.

Moreover, the processing unit PU 301 is arranged to control a further wireless communication module 303 provided in the r-c device 105. In one embodiment, such further wireless module 303 comprises a respective RF transceiver (Tx/Rx) 304 coupled to an antenna 305 acting to transmit/receive wireless signals. In the same way as described with reference to the wireless module 203, such transceiver 304 can operate in accordance with different wireless communication standard protocols, such as Bluetooth, WLAN, NFC, ZigBee or Wibree, and/or others.

In addition, the r-c device 105 comprises a further encoder/decoder block (not shown in FIG. 3), which may be embedded within the transceiver 304. Such encoder/decoder block is controlled by the processing unit PU 301 for encrypting/decrypting data streams exchanged with other consumer electronic equipment in the wireless network system 100.

In one embodiment, the r-c device 105 also comprises input/output interfaces for a user. Particularly, such user interfaces comprise a display unit 306, such as a LCD (Liquid Crystal Display) or a LED (Light Emitting Diode), and a tactile interface 307, such as, for example, an alphanumeric keyboard or a button.

The r-c device 105 comprises also a power supply 308 such as a battery.

In a further embodiment, the r-c device 105 also comprises a slot 309 for receiving a removable memory unit, such as an integrated circuit card like a smart card or a memory card.

In one embodiment, a local interface 310, such as a digital bus, is provided within the r-c device 105 in order to couple and allow all electronic components comprised in such equipment to communicate among them.

As known, in order to allow the first 103 consumer equipment to establish a secure communication with the second 104 equipment through the wireless network WNET 102, such equipment have to be paired, e.g., they have to authenticate each other and to authenticate their respective public keys.

In the following, it is assumed that the first 103 and second 104 equipment have a different trademark, e.g., they have different secret keys. Furthermore, a common certification authority is also avoided.

Figure 4:
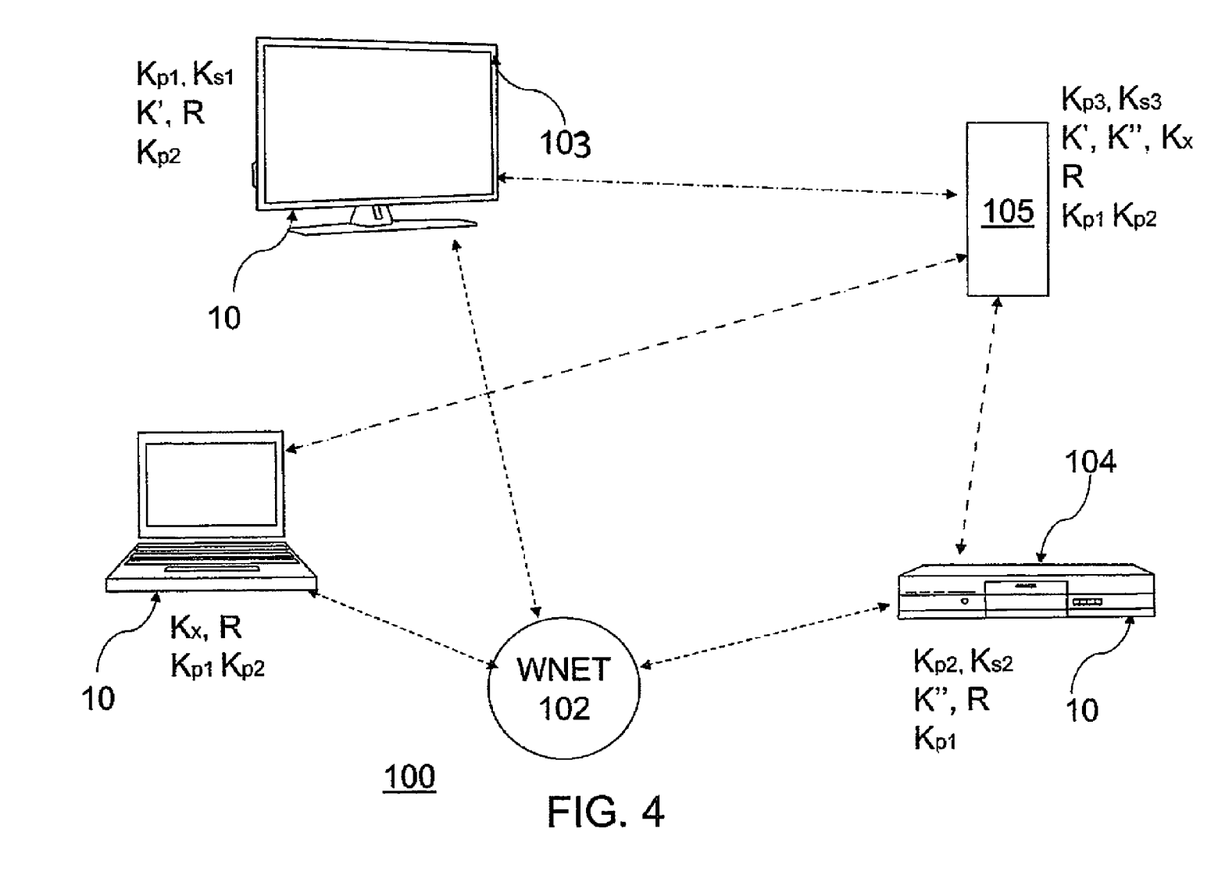
FIG. 4 shows schematically electronic consumer equipment and the electronic device interacting during an embodiment of a pairing method.

Moreover, with reference to FIG. 4, it is assumed that both consumer equipment 103 and 104 have associated own public and private keys stored in their memory 202. Particularly, a first public key $K_{p1}$ and a first private key $K_{s1}$ are stored in the memory 202 of the first electronic equipment 103 and, analogously, a second public key $K_{p2}$ and a second private key $K_{s2}$ are stored in the corresponding memory 202 of the second equipment 104. The first public key $K_{p1}$ differs from the second one $K_{p2}$ and the first private key $K_{s1}$ differs from the second one $K_{s2}$, respectively.

In addition, a third public key $K_{p3}$ and a third private key $K_{s3}$ are associated to the r-c device 105, particularly, stored in the memory element 302.

Figure 5:
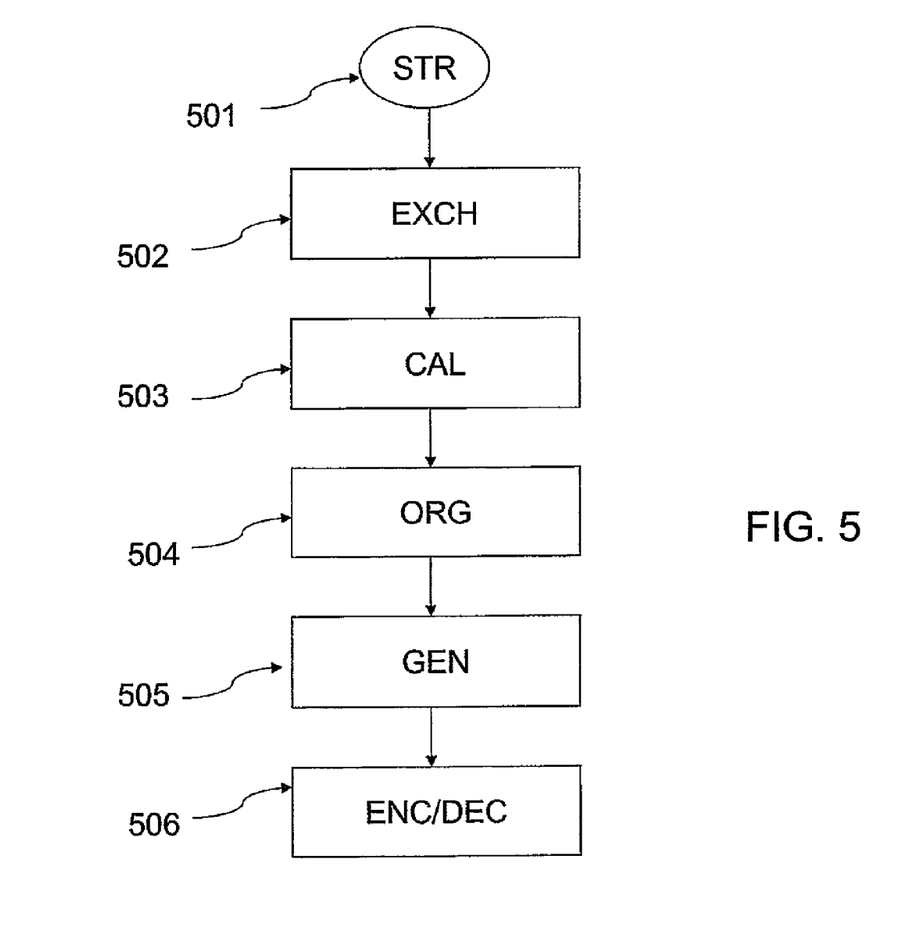
FIG. 5 is flowchart illustrating an embodiment the pairing method for consumer electronic equipment comprised in the wireless network system of FIG. 1.

An embodiment of a method for pairing such first 103 and second 104 consumer equipment in the in-home wireless network system 100 can be described with reference to FIGS. 4 and 5.

First, a selection step 501 (STR) takes place, in which one of the electronic equipment, for example, the first consumer equipment 103 acts as a starter for the method searching other equipment to establish a secure wireless communication by using its own wireless communication module 203.

In the following, it will be assumed that both the wireless communication modules 203 comprised in the first 103 and second 104 equipment and the further wireless communication module 303 of the r-c device 105 all operate, in one embodiment, in accordance with a Bluetooth standard. However, other wireless communication protocols can also be used.

In this case, when the r-c device 105 is brought by the user in closeness to the first equipment 103, such last equipment 103 detects, through the Bluetooth connection, the presence of the former 105 being inside an area of a range equal to the maximum capacity of such wireless connection. In an embodiment, the digital TV 103 displays on a screen all devices detected inside such Bluetooth area and the user can select, among others, the r-c device 105.

After the selection step, the pairing procedure can be activated. Particularly, during a first transmission step 502 (EXCH) the first equipment 103 sends its own public key, e.g., the first public key $K_{p1}$, to the r-c device 105 by its wireless communication module 203. The same r-c device 105 replies by sending the third public key $K_{p3}$ to the first equipment 103 by the respective further wireless module 303.

To ensure that nobody has modified the communication above and the public keys $K_{p1}$, $K_{p3}$ have been exchanged correctly, the user checks on displays 206, 306 of equipment 103 and device 105 that a same reference number is correctly displayed. For example, such number is a word including six digits.

Such transmission step 502 is performed in accordance with a cryptographic procedure for pairing related to the Bluetooth standard known by those skilled in the art. Further details concerning cryptographic functions, protocols and algorithms involved in a pairing procedure for Bluetooth are disclosed in document "Simple Pairing Whitepaper", Released Version of Lisbon release Bluetooth Core Specification, Mar. 8, 2006, which is incorporated herein by reference.

The proposed pairing method further provides a calculation step 503 (CAL) in which both the first equipment 103 and the r-c device 105 are suitable to independently calculate a same shared secret number. Particularly, both equipment 103 and device 105 can calculate a first shared secret number K' starting from the exchanged public keys $K_{p1}$, $K_{p3}$ and their own private keys $K_{s1}$, $K_{s3}$ according to a Diffie-Hellman encryption protocol known by those skilled in the art.

In more detail, the shared secret number K' is calculated as:

$$K' = (K_{p3})^{K_{s1}} = (K_{p1})^{K_{s3}} \quad (1)$$

It should be noted that, further cryptographic algorithms involving public keys can be used to calculate such first secret number K' such as, for example, the elliptic curves.

Therefore, the first equipment 103 ad the r-c device 105 can safely communicate (in authenticated manner) through the wireless network 102 by sharing a same secret. In other words, the first equipment 103 is paired with the r-c device 105.

When the r-c device 105 is brought by the user in closeness to the second equipment 104 to be paired, for example the DVD player located in another room, the transmission step 502 and calculation step 503 of the method are repeated. Particularly, the second equipment 104 sends its second public key $K_{p2}$ to the r-c device 105 which responds by sending the third public key $K_{p3}$. Therefore, the second equipment 104 and the r-c device 105 are suitable to independently calculate a same second shared secret number K" (analogously to the first one K' according to a Diffie-Hellman encryption protocol) as:

$$K'' = (K_{p3})^{K_{s2}} = (K_{p2})^{K_{s3}} \quad (2)$$

Therefore, the second equipment 104 ad the r-c device 105 can safely communicate (in authenticated manner) through the wireless network 102 by sharing a same secret. Therefore, also the second electronic equipment 104 is paired with the r-c device 105.

Advantageously, in one embodiment, the pairing method further provides an organizing step (ORG) of data related to the equipment 103, 104 interacting in turn with the r-c device 105. In more detail, the r-c device 105 is arranged to create a first record or association record stored in its memory 302 for listing all equipment visited within the wireless network system 100 and their corresponding shared secret numbers. With reference to the example above, such record comprises the secret numbers K', K" shared by the first 103 and second 104 equipment, respectively, in the in-home network system 100.

In a further embodiment, the r-c device 105 is also arranged to create in its own memory 302 a second record for storing all public keys associated to the electronic equipment 10 of in-home network system 100. Such second record can also include further information concerning all electronic equipment 10 in the in-home system, such as information indicating some features of equipment (for example whether they are provided with a display, a keyboard, etc.).

Subsequently, in order to complete pairing, e.g., to allow a safe communication among the first 103 and the second 104 equipment, the pairing method also provides a generation step 505 (GEN) in which the r-c device 105 generates a random number R to be provided to both equipment 103 and 104.

In a subsequent encryption/decryption step 506 (ENC/DEC), the r-c device 105 encrypts the generated random number R by using the first shared secret number K' as an encryption key according, for example, to an Advanced Encryption Standard (AES) algorithm known in the art. Further block ciphers can also be used such as Triple Data Encryption Standard (3DES). The result of this operation is sent by the r-c device 105 as encrypted message M' to the first equipment 103 which, in turn, can decrypt such message M' by the first shared number K' at its disposal.

Analogously, the r-c device 105 encrypts the random number R by the second shared secret number K" for sending the result of this operation as further encrypted message M" to the second equipment 104. This last can decrypt, in turn, such further message M" by the second shared number K" at its disposal.

Therefore, by performing the proposed method, both the first 103 and second 104 equipment can share a common secret key, e.g., the random number R, that they can use for any further safe communication between them through the wireless network 102 (WNET).

Such random number R is also stored in the association record of the r-c device 105.

In an embodiment of the method, the r-c device 105 can manage the authentication of all consumer electronic equipment 10 within the in-home wireless network system 100 in such a way that a same random number R represents a communication secret key for all such equipment 10. In this way, all wireless communications among any two equipment in the home are clear for any other equipment of the system 100.

In a further embodiment, the r-c device 105 can provide a plurality of random numbers $R_1, R_2, \ldots, R_n$ each one representing a communication secret key for a couple of paired consumer equipment.

In a further embodiment of the pairing method, the generation step 505 of the random number R can be avoided.

In this case, the encryption/decryption step 506 provides that the r-c device 105 can use algorithms, such as Message Authentication Code based on Hash functions (HMAC) or Message Authentication Code based on block Ciphers (CMAC), in order to generate a first value HMAC (or CMAC) starting from the first public key $K_{p1}$ of the first equipment 103 and the second shared secret number K".

Such HMAC and CMAC algorithms are known by those skilled in the art. For example, it will be assumed that both the r-c device 105 and the first 103 and second 104 equipment are provided with a HMAC algorithm.

Successively, the r-c device 105 wirelessly sends both the first public key $K_{p1}$ in clear and the first value HMAC to the second equipment 104. In this way, such second equipment 104 can generate a second value HMAC starting from the received first public key $K_{p1}$ and the same secret number K". Then, the second equipment 104 compares the first and second values HMAC to verify if the first public key $K_{p1}$ has been modified by a malicious party during transmission.

Therefore, if the first and second values HMAC coincide the first public key $K_{p1}$ is safely acquired by the second equipment 104.

Analogously, the r-c device 105 uses the HMAC algorithm to generate a further first value HMAC starting from the second public key $K_{p2}$ of the second equipment 104 and the first shared secret number K'. After that, the r-c device 105 wirelessly sends both the second public key $K_{p2}$ in clear and the further first value HMAC to the first equipment 103. In this way, such first equipment 103 can generate a further second value HMAC starting from the received second public key $K_{p2}$ and the same secret number K'. Then, the first equipment 103 compares the further first and further second values HMAC to verify if the second public key $K_{p2}$ has been modified during transmission. If the further first and further second values HMAC coincide, the second public key $K_{p2}$ is safely acquired by the first equipment 104.

In this way, the first 103 and second 104 equipment are paired as they have authenticated their respective public keys.

In alternative embodiment, the encryption/decryption step 506 provides that also digital signature algorithms can be used. Particularly, the r-c device 105 can use a generating signature algorithm such as a public key cryptography algorithm RSA. Particularly, the r-c device 105 is suitable to generate a signature of the first public key $K_{p1}$ starting from its third private key $K_{s3}$.

Successively, the r-c device 105 wirelessly sends both the first public key $K_{p1}$ in clear and the generated signature to the second equipment 104. Such second equipment 104 is provided with a verifying signature algorithm (for example, RSA) to generate a verify value starting from the received first public key $K_{p1}$ and the third public key $K_{p3}$. Then, the second equipment 104 compares such value with the signature received to verify if the first public key $K_{p1}$ has been modified during transmission. If the signature and the verify value coincide, the first public key $K_{p1}$ is safely acquired by the second equipment 104.

The same observations above can be applied to the second public key $K_{p2}$ to be transmitted to the first equipment 103.

As the first 103 and second 104 equipment have safely exchanged their respective public keys $K_{p1}$ and $K_{p2}$ through interposition of a secure communication channel, e.g., the r-c device 105, they are suitable to start a secure wireless communication section between them.

An embodiment of the method ensures a fast and secure pairing of big and heavy consumer equipment located in different rooms at home avoiding any displacement of such equipment.

With reference to FIG. 4, in order to introduce a new electronic equipment 10 within the in-home network system 100, for example a laptop computer 10, the user brings the r-c device 105 in closeness to it. Then, the pairing procedure is carried out analogously as described with reference to the first equipment 103 so that the new equipment 10 and the r-c device 105 are suitable to evaluate a same third shared secret number $K_x$. Such third secret number $K_x$ is stored in the association record of the r-c device 105.

Starting from the shared secret number $K_x$, in an embodiment, the r-c device 105 is arranged to send to the new equipment 10 the secret communication key R used by the first 103 and second 104 equipment to securely communicate within the wireless network system 100.

In a further embodiment, through encryption with the third secret number $K_x$, the r-c device 105 is arranged to send to the new equipment 10 the public keys of other equipment comprised in the wireless network system 100, e.g., the first $K_{p1}$ and the second $K_{p2}$ public keys in the proposed example.

In this way, an embodiment of the method provides a logic building up of the in-home wireless network system 100 further to guarantee safe communications among the electronic equipment involved.

In an embodiment, by providing a slot 309 for a removable memory unit in the r-c device 105, both the first and second records stored in the memory element 302 can also be copied in such memory unit. In this way, the r-c device 105 can be replaced with an updated new equipment by simply removing the memory unit and subsequently inserting it in the new equipment without losing data related to the wireless network system 100.

Figure 6:
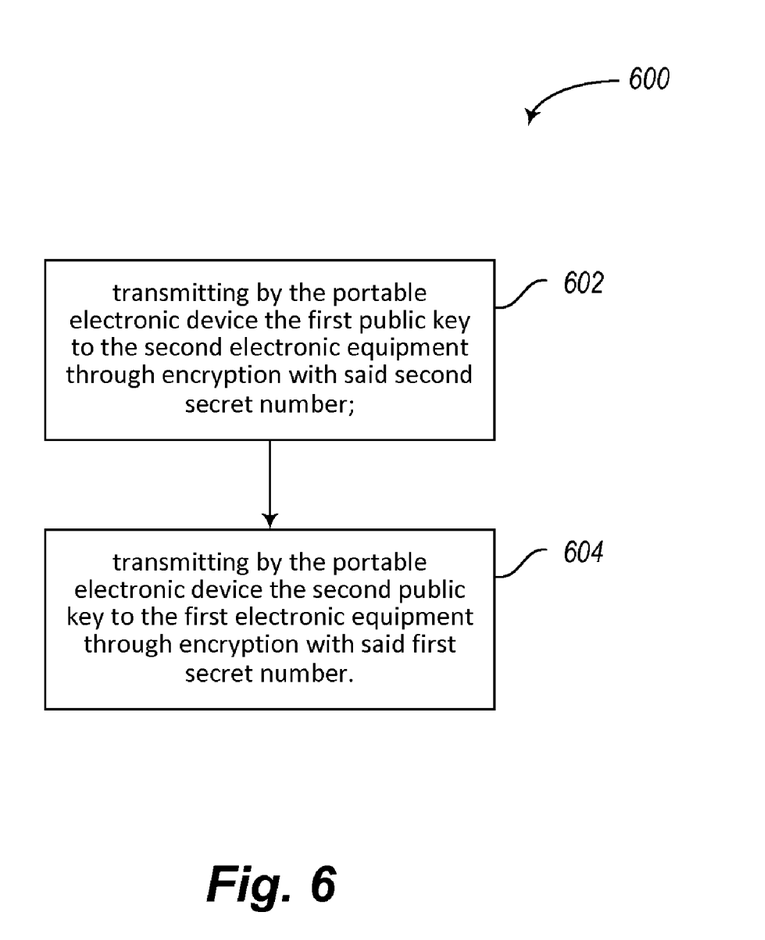
FIG. 6 is a flowchart illustrating an embodiment of a method of providing a secure communication key.
Figure 7:
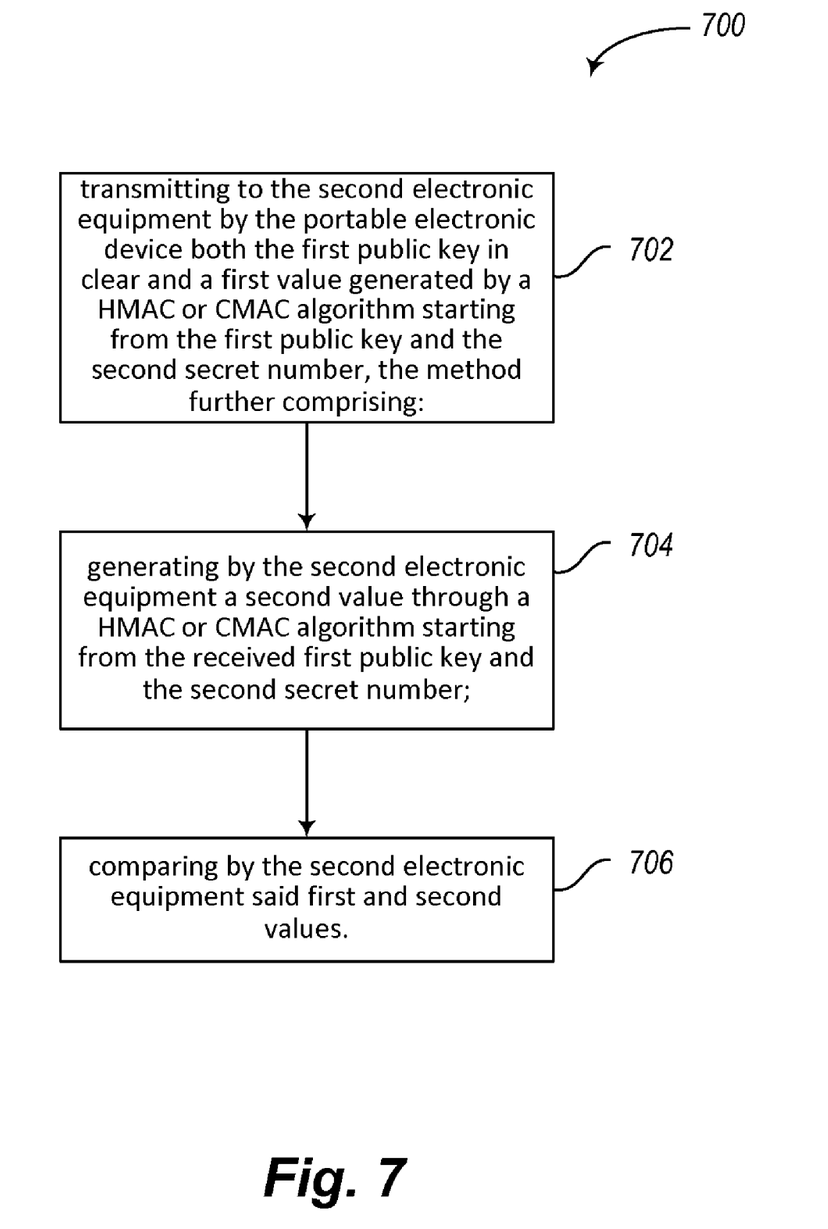
FIG. 7 is a flowchart illustrating an embodiment of a method of providing a secure communication key.
Figure 8:
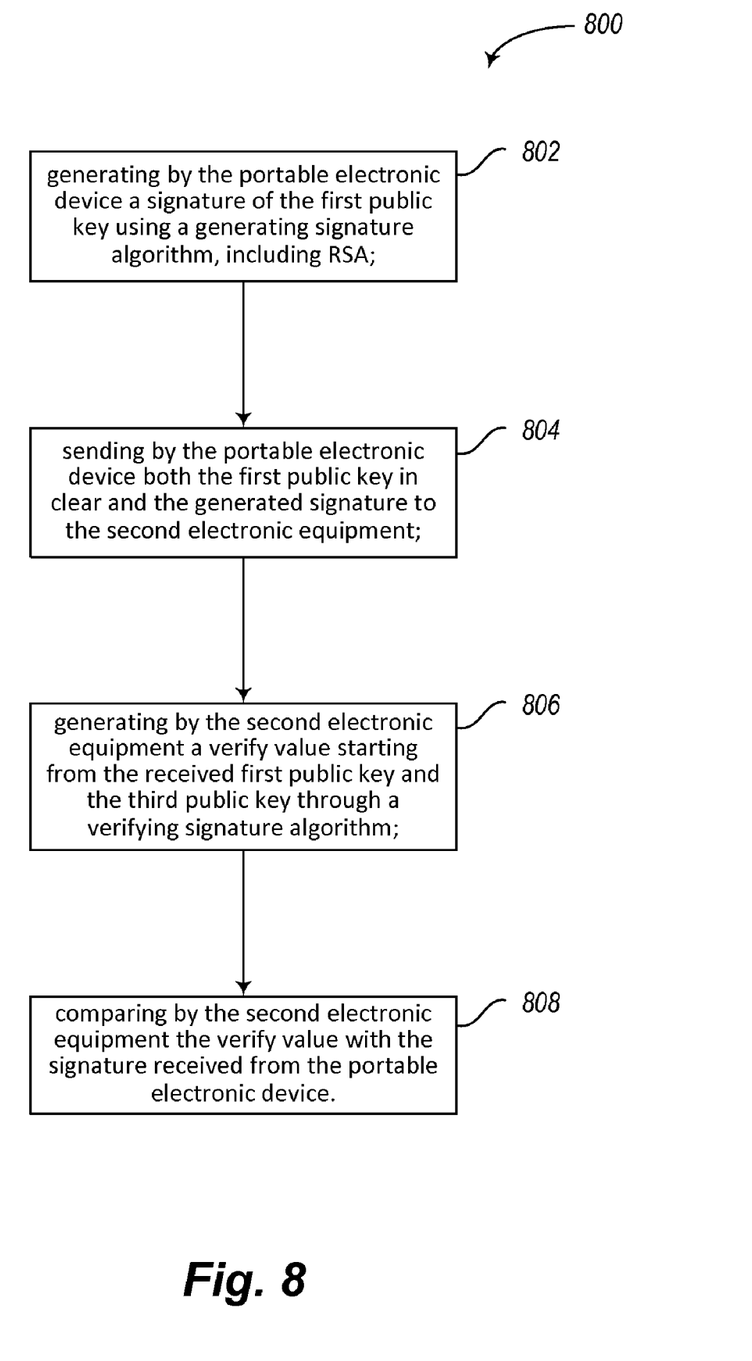
FIG. 8 is a flowchart illustrating an embodiment of a method of providing a secure communication key.

FIG. 6 illustrates an embodiment of a method 600 of providing by a portable device a secure communication key to be transmitted in turn to first and second equipment through encryption with first and second secret numbers, respectively. In step 602, transmitting by the portable electronic device of the first public key to the second electronic equipment through encryption with said second secret number occurs. In step 604, transmitting by the portable electronic device of the second public key to the first electronic equipment through encryption with said first secret number occurs. FIG. 7 illustrates an embodiment of a method 700 of providing by a portable device a secure communication key to be transmitted in turn to first and second equipment through encryption with first and second secret numbers, respectively. In step 702, transmitting to the second electronic equipment by the portable electronic device of both the first public key in clear and a first value generated by a HMAC or CMAC algorithm starting from the first public key and the second secret number occurs. In step 704, generating by the second electronic equipment a second value through a HMAC or CMAC algorithm starting from the received first public key and the second secret number occurs. In step 706, comparing by the second electronic equipment of said first and second values occurs. FIG. 8 illustrates an embodiment of a method 800 of providing by a portable device a secure communication key to be transmitted in turn to first and second equipment through encryption with first and second secret numbers, respectively. In step 802, generating by the portable electronic device of a signature of the first public key using a generating signature algorithm, including RSA occurs. In step 804, sending by the portable electronic device of both the first public key in clear and the generated signature to the second electronic equipment occurs. In step 806, generating by the second electronic equipment a verify value starting from the received first public key and the third public key through a verifying signature algorithm occurs. In step 808, comparing by the second electronic equipment of the verify value with the signature received from the portable electronic device occurs.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
providing first and second wireless electronic equipment to be paired and which store a first and a second public key, respectively;
providing a user with a wireless portable electronic device storing a third public key;
transmitting by the portable electronic device said third public key in turn to the first and second electronic equipment, and receiving from the first and second equipment said first and second public keys, respectively;
calculating by said portable electronic device first and second numbers starting from the first and second public keys, respectively, same said first and second numbers being independently calculated by the first and second electronic equipment, respectively, starting from said third public key and representing secret numbers shared between the portable device and said first and second electronic equipment; and
providing by the portable device a secure communication key to be transmitted in turn to the first and second equipment through encryption with said first and second secret numbers, respectively.

2. The method according to claim 1, further comprising:
generating by the portable electronic device a random number representing said secure communication key for both the first and second electronic equipment.

3. The method according to claim 2, further comprising:
generating by the portable electronic device a plurality of random numbers each one representing said secure communication key for a couple of paired electronic equipment included within the wireless network system.

4. The method according to claim 1 wherein said providing said secure communication key includes:
transmitting by the portable electronic device the first public key to the second electronic equipment through encryption with said second secret number; and
transmitting by the portable electronic device the second public key to the first electronic equipment through encryption with said first secret number.

5. The method according to claim 1 wherein said calculating the first and second secret numbers is performed according to public key cryptographic algorithms, including Diffie-Hellman algorithm or elliptic curves.

6. The method according to claim 5 wherein the first and the second shared secret numbers are calculated as:

$$K' = (K_{p3})^{\wedge} K_{s1} = (K_{p1})^{\wedge} K_{s3}$$

$$K'' = (K_{p3})^{\wedge} K_{s2} = (K_{p2})^{\wedge} K_{s3}$$

where:
$K_{p1}$ and $K_{s1}$ are respectively the first public key and a private key of the first electronic equipment,
$K_{p2}$ and $K_{s2}$ are respectively the second public key and a private key of the second electronic equipment, and
$K_{p3}$ and $K_{s3}$ are respectively the third public key and a private key of the portable electronic device.

7. The method according to claim 1, further comprising:
creating in a memory of the portable electronic device a first record to list data related to the first and second equipment in the wireless network system.

8. The method according to claim 7 wherein said record includes the first and second secret numbers and the secure communication key.

9. The method according to claim 7, further comprising:
creating in the memory of the portable electronic device a second record to list public keys associated to the first and second electronic equipment.

10. The method according to claim 9, further comprising:
updating data listed in said first and second records of the portable electronic device with further data related to a further paired electronic equipment introduced in the wireless network system.

11. The method according to claim 9, further comprising:
copying data listed in the first and second records from the memory of the portable electronic device to a removable memory included in same said portable electronic device.

12. The method according to claim 1 wherein transmitting said secure communication key comprises:
encrypting said secure communication key with the first and second shared secret numbers for respectively generating first and second messages according to an Advanced Encryption Standard (AES) or to a Triple Data Encryption Standard (3DES);
sending by the portable electronic device the first message to the first electronic equipment and the second message to the second electronic equipment; and decrypting in the first electronic equipment said first message by the first shared secret number and in said second electronic equipment said second message by the second shared secret number.

13. The method according to claim 1, further comprising:
selecting by the first or second electronic equipment the portable electronic device to establish a secure wireless communication, wherein said selecting includes:
bringing in turn by the user said portable electronic device in closeness to the first and second electronic equipment; and
detecting by the first and second equipment through a wireless connection, presence of said portable electronic device being inside an area of a range equal to a maximum capacity of such wireless connection.

14. The method according to claim 1 wherein said providing said secure communication key includes:
transmitting to the second electronic equipment by the portable electronic device both the first public key in clear and a first value generated by a Message Authentication Code based on Hash functions (HMAC) or a Message Authentication Code based on block Ciphers (CMAC) algorithm starting from the first public key and the second secret number, the method further comprising:
generating by the second electronic equipment a second value through a HMAC or CMAC algorithm starting from the received first public key and the second secret number; and
comparing by the second electronic equipment said first and second values.

15. The method according to claim 1 wherein said providing said secure communication key includes:
generating by the portable electronic device a signature of the first public key using a generating signature algorithm;
sending by the portable electronic device both the first public key in clear and the generated signature to the second electronic equipment;
generating by the second electronic equipment a verify value starting from the received first public key and the third public key through a verifying signature algorithm; and
comparing by the second electronic equipment the verify value with the signature received from the portable electronic device.

16. A wireless network system, comprising:
first and second wireless electronic equipment adapted to be paired and which store first and second public keys, respectively, each of said first and second equipment being provided with a respective wireless communication module;
a wireless portable electronic device adapted to store a third public key, said portable electronic device including:
a first wireless communication module adapted to transmit said third public key in turn to the first and second electronic equipment, and adapted to receive from the first and second equipment said first and second public keys, respectively;
a processing module adapted to calculate first and second numbers starting from the first and second public keys, respectively, same said first and second numbers being independently calculated by the first and second electronic equipment, respectively, starting from said third public key and representing secret numbers shared between the portable device and said first and second electronic equipment;
wherein the portable electronic device is arranged to provide a secure communication key to be transmitted in turn to the first and second equipment through encryption with said first and second secret numbers, respectively.

17. The wireless network system of claim 16 wherein said secure communication key includes at least a random number generated by the portable electronic device.

18. The wireless network system of claim 16 wherein,
the portable electronic device is configured to encrypt the first public key using said second secret number and transmit the encrypted first public key to the second electronic device; and
the portable electronic device is configured to encrypt the second public key using said first secret number and transmit the encrypted second public key to the first electronic device.

19. The wireless network system of claim 16 wherein said first and second electronic equipment include consumer devices such as: a digital TV, a set-top box, a mobile phone, a PDA, a DVD player, a laptop or desktop computer, a refrigerator, a washing machine, or a webcam.

20. A wireless portable electronic device, comprising:
a wireless communication module adapted to communicate with first and second electronic equipment;
a processing module adapted to calculate first and second numbers representing secret numbers shared between the portable device and said first and second electronic equipment;
a module adapted to provide a secure communication key in turn to the first and second equipment through encryption with said first and second secret numbers, respectively.

21. The wireless portable electronic device according to claim 20 wherein said processing module includes a microprocessor, a microcontroller, or a dedicated processor including a DSP.

22. The wireless portable electronic device according to claim 20 wherein said processing module is coupled to memory elements adapted to store both the first and second shared secret numbers and the secure communication key.

23. The wireless portable electronic device according to claim 20 wherein said wireless communication module includes a transceiver RF controlled by the processing module and coupled to an antenna to transmit and receive wireless signals communicated with the first and second electronic equipment.

24. The wireless portable electronic device according to claim 23 wherein said transceiver operates in accordance with different wireless communication standard protocols, including Bluetooth, WLAN, NFC, ZigBee or Wibree.

25. The wireless portable electronic device according to claim 23, further comprising an encoder/decoder block embedded within the transceiver and controlled by the processing module, said encoder/decoder block being adapted to encrypt/decrypt data streams exchanged with the electronic equipment in a wireless network system.

26. The wireless portable electronic device according to claim 20, further comprising a display unit, including a LCD or a LED, and a tactile interface, including an alphanumeric keyboard or a button.

27. The wireless portable electronic device according to claim 20 further comprising a slot adapted to receive a removable memory unit, including a integrated circuit card or a memory card.

28. The wireless portable electronic device according to claim 20 wherein said electronic device includes a remote control device adapted to operate in a stand alone configuration.

29. The wireless portable electronic device according to claim 20 wherein said electronic device is embedded in a TV or VCR or DVD remote control or in a mobile phone.

30. A first electronic device, comprising:
a storage unit adapted to store a first public key;
a wireless communication module coupled to said storage unit and adapted to provide said stored first public key to a portable electronic device and adapted to receive a public key from said portable electronic device; and
a processing module coupled to said wireless communication module and adapted to calculate a first number using said received public key from said portable electronic device, said first number representing a first secret number shared between the portable electronic device and said first electronic device,
wherein said communication module is further adapted to receive a secure communication key from said portable electronic device, said received secure communication key being generated by said portable electronic device through encryption of a random number with said first secret number.

31. The first electronic device of claim 30 wherein said processing module is adapted to calculate the first number according to a public key cryptographic algorithm.

32. The first electronic device of claim 31 wherein said first number is calculated according to $K'=(K_{p3})^{\wedge}K_{s1}=(K_{p1})^{\wedge}K_{s3}$, wherein:
$K_{p1}$ and $K_{s1}$ are respectively the first public key and a private key of the first electronic device; and
$K_{p3}$ and $K_{s3}$ are respectively the public key and a private key of the portable electronic device.

33. The first electronic device of claim 30 wherein if said portable electronic device is brought in proximity to said first electronic device, said first electronic device is adapted to detect said portable electronic device through a wireless connection if said portable electronic device is inside an area of a range equal to a maximum capacity of said wireless connection.

34. A method, comprising:
pairing first and second electronic devices, which respectively store first and second public keys, in a wireless network system, by:
transmitting by a portable electronic device a third public key to the first and second electronic devices, and respectively receiving by said portable electronic device from the first and second devices said first and second public keys;
calculating by said portable electronic device first and second secret numbers using said received first and second public keys, respectively, same said first and second secret numbers being independently calculated by the first and second electronic devices, respectively, using said third public key, said first and second secret numbers being respectively shared between the portable electronic device and said first and second electronic devices; and
transmitting, by the portable device to the first and second devices, a secure communication key obtained by the portable electronic device through encryption using said first and second secret numbers, respectively.

35. The method of claim 34, further comprising:
generating by the portable electronic device a random number representing said secure communication key for both the first and second electronic devices.

36. The method of claim 34 wherein the first and the second secret numbers are calculated as:

$$K'=(K_{p3})^{\wedge}K_{s1}=(K_{p1})^{\wedge}K_{s3}$$

$$K''=(K_{p3})^{\wedge}K_{s2}=(K_{p2})^{\wedge}K_{s3}$$

where:
$K_{p1}$ and $K_{s1}$ are respectively the first public key and a private key of the first electronic device,
$K_{p2}$ and $K_{s2}$ are respectively the second public key and a private key of the second electronic device, and
$K_{p3}$ and $K_{s3}$ are respectively the third public key and a private key of the portable electronic device.

37. The method of claim 34 wherein said transmitting said secure communication key includes:
encrypting by said portable electronic device said communication key with the first and second secret numbers to respectively generate first and second messages; and
sending by the portable electronic device the first message to the first electronic device and the second message to the second electronic device, to enable decrypting in the first electronic device said first message by the first secret number and to enable decrypting in said second electronic device said second message by the second secret number.

* * * * *